April 14, 1970  W. F. HOPKINS  3,506,628
POLYMERIZATION METHOD AND APPARATUS
Filed Oct. 17, 1966
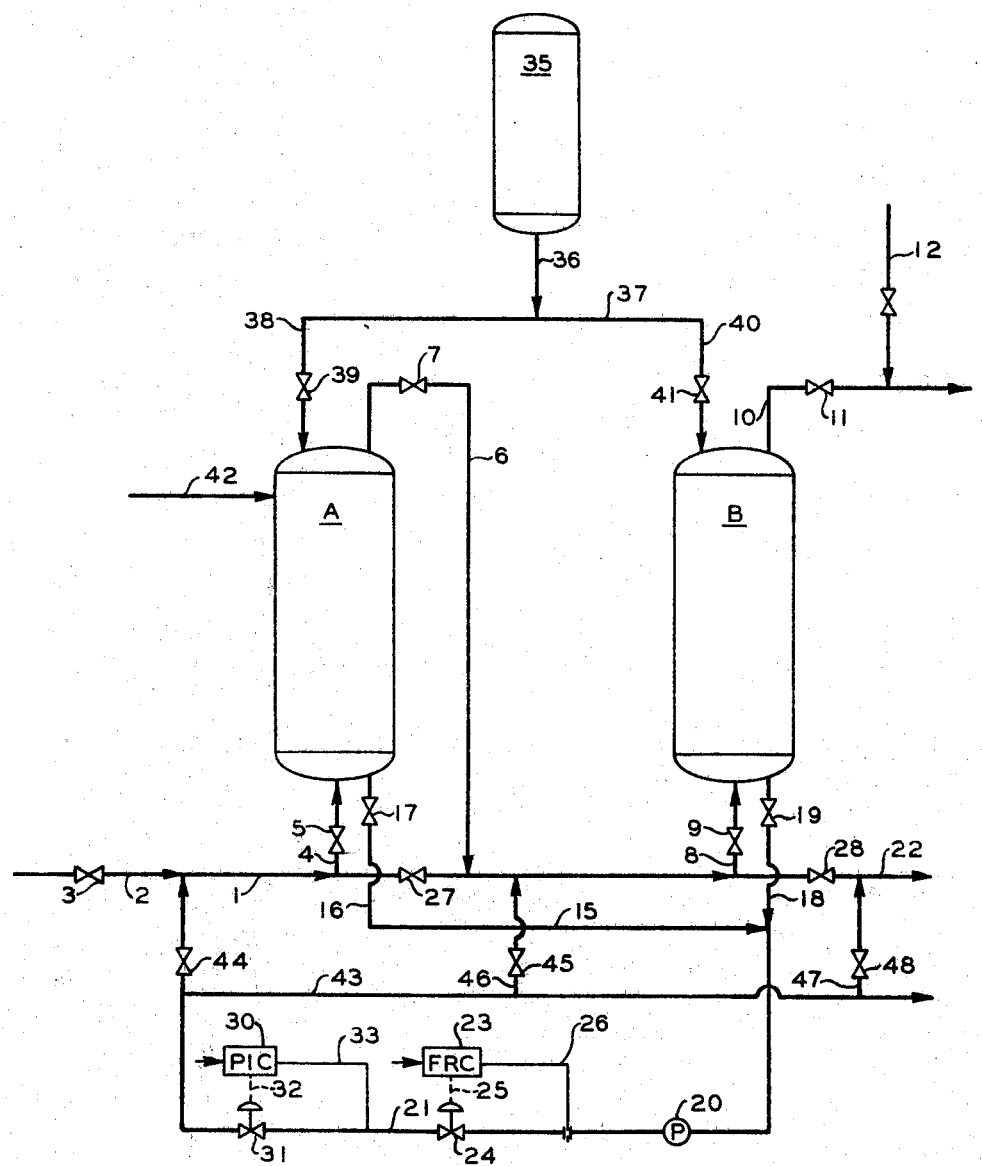
INVENTOR
W. F. HOPKINS
BY Young + Quigg
ATTORNEYS United States Patent Office 3,506,628
Patented Apr. 14, 1970

3,506,628
POLYMERIZATION METHOD AND APPARATUS
Wayne F. Hopkins, Borger, Tex., assignor to Phillips
Petroleum Company, a corporation of Delaware
Filed Oct. 17, 1966, Ser. No. 587,275
Int. Cl. C08d 1/00, 3/06; B01i 1/00
U.S. Cl. 260—83.7　　　　　　　　　　　　　　8 Claims

ABSTRACT OF THE DISCLOSURE

The product polymer of a continuous, series polymerization process is shortstopped in a continuous manner by stopping the polymerization feed to the first reaction zone, isolating the first reaction zone from the series, removing the polymerization reaction contents from the first reaction zone, and introducing same into the next adjacent downstream reaction zone, and repeating this process for each subsequent reaction zone of the series. While the series of reaction zones are being emptied, a polymerization reaction stopping agent is introduced into the effluent from the last reaction zone of the series. This can be accomplished by having a double set of headers with the reactants being introduced during the normal course of the reaction through the first header, through the first reaction zone, back into the first header, into the second reaction zone, and the like. To stop the polymerization, effluent is withdrawn into the second header and conveyed by pump means back into the first header, where appropriate valve means allow the withdrawn material to be introduced into the next succeeding reactor.

This invention relates to a method and apparatus for carrying out a polymerization operation. In one aspect this invention relates to a method and apparatus for stopping a continuous polymerization method.

Heretofore some polymers have been made by continuously polymerizing a monomer by passing the polymerization reaction mixture continuously through a plurality of reactors connected in series. Generally, while carrying out a continuous polymerization reaction of this type when it was desired to stop the polymerization process, the feed to the first reactor of the series was stopped and thereafter the polymerization reaction was stopped using a batch-wise technique which comprised adding the shortstopping agent to the last reactor in the series first, i.e. the reactor which contained the polymerization mixture which has reacted for the longest time, and then adding shortstop to each subsequent upstream reactor thereby working back to the first reactor of the series, i.e. the reactor which contained the polymerization reaction mixture with least reaction time.

It has now been found that the product polymer of a continuous, series polymerization process can be made to more closely approximate the properties required by the specifications for that product polymer by not shortstopping the polymerization process in a batch-wise manner but rather shortstopping the process in a continuous manner. The continuous manner of this invention comprises, after stopping the polymerization feed to the first reaction zone, isolating the first reaction zone from the series, removing the polymerization reaction contents from the first reaction zone (i.e. emptying that zone) and introducing same into the next adjacent downstream reaction zone, and repeating this process for each subsequent reaction zone of the series. While the series of reaction zones are being emptied, a polymerization reaction stopping agent, i.e. shortstop, is introduced into the effluent from the last reaction zone of the series.

By this process it was found that the Mooney value, and other physical properties of the product polymer can be made to more closely approximate the desired properties as set out by the specifications for the polymer to be produced by the process. Further, by this process, no shortstop is introduced into the reactors themselves and therefore there are no problems with this invention which give rise when a reactor or reactors become contaminated with catalyst inactivating materials. Further, by this invention consecutive polymerization processes can follow one another more closely, and, therefore, the overall output of the polymerization apparatus substantially increased. This increase in productivity with the same apparatus is realized because after the first few reaction zones have been emptied and while the remaining reaction zones are being emptied, the empty reaction zones can be filled with reactants for a new polymerization process and the new polymerization process even initiated, if desired.

By this invention the apparatus employed comprises at least two reactors connected in series by use of a first header means for feeding materials to the reactors and transferring material from one reactor to the next, and by the use of a second header means for draining each reactor and pumping the contents of the drained reactor to the next adjacent downstream reactor and so forth until each reactor has been individually drained. Means is also provided for introducing a shortstop into the effluent of the last reactor of the series.

By use of the apparatus of this invention an advantage is gained in that only a single pumping means need be used in conjunction with the header means for draining the reactors and therefore a single pumping means is used to drain all the reactors of the series, no matter how many reactors there are in that series.

The polymer produced by the method and apparatus of this invention can be rubber such as polybutadiene which is useful in automotive tires and resins such as polyethylene and polypropylene which are useful in making bottles, rug fibers, dishes, tote boxes, and the like.

Accordingly, it is an object of this invention to provide a new and improved method and apparatus for carrying out a polymerization reaction. It is another object of the invention to provide a new and improved method and apparatus for stopping a continuous polymerization process employing a plurality of separate reaction zones connected in series. It is another object of this invention to provide a new and improved method and apparatus for carrying out a polymerization process and stopping same so that the final polymer properties more closely approximate, than was heretofore possible, the desired final properties.

Other aspects, objects, and the several advantages of this invention will be apparent to those skilled in the art from the description, drawing, and appended claims.

The drawing shows a system embodying this invention.

In the drawing there are shown two reactors A and B. Only two reactors are shown for the sake of brevity and clarity although any number of reactors, e.g. 10, 13, 20, or more, can be employed in series and will be connected in the same manner as reactors A and B of the drawing.

In the drawing there is shown a header means 1 to the upstream end of which is connected a conduit 2 having valve 3. One or more polymerization reactants, e.g. monomer, is passed through conduit 2, header 1, conduit 4 (which contains valve 5), into the feed inlet end of reactor A. The effluent polymerization reaction mixture from reactor A passes through line 6 (which contains valve 7) back to header 1 and then through line 8 (which contains valve 9) into reactor B. Valve 27 in header 1 is placed upstream of the point where line 6 joins header 1 to facilitate isolating reactor A from the series, if desired. The polymerization reaction mixture effluent from reactor B passes through line 10 (which contains valve 11) to a conventional polymer recovery process, storage, and the like. Polymerization stopping agent (shortstop) is added to the effluent of reactor B (or the effluent of the last reactor of the series if more than two reactors are present) through valved line 12.

If more than two reactors are in series line 10 will be connected to header 1 in the same manner as the drawing shows line 6 being connected to that header and therefore the effluent from reactor B will pass through line 10, header 1, and a valved line similar to line 8 of the drawing into the next downstream reactor from B. This process is repeated until the last reactor is reached wherein the process and apparatus is carried out as discussed hereinabove with reference to reactor B. Each reactor will also be connected to header 15 through a valved line such as line 16.

A second header 15 is connected to the interior of reactors A and B at the bottom of those reactors so that the contents of the reactors can be substantially completely removed therefrom by way of line 16 (which contains valve 17) and line 18 (which contains valve 19), respectively. The downstream end of header 15 is connected through pumping means 20 and line 21, to an upstream portion of header 1 between the points where lines 2 and 4 join header 1. Thus, the contents from reactor A can be emptied through line 16, header 15, line 21, header 1, and line 8 into reactor B so that the contents of reactor A obtain their full reaction time by being processed through the remainder of the series of reactors even though there is no longer any new feed being charged to the first reactor of the series, i.e. A. Thus, before the contents of reactor A is shortstopped in line 10 in the vicinity of where that line is joined by line 12 it passes through the remaining series of reactors. This is true of the contents of all the reactors in the series.

The contents of reactor B are removed through line 8, header 15, line 21, and header 1 with the outlet end 22 of header 1. The outlet end 22 can be shortstopped in the same manner as line 10 and the effluent from header 1 can be treated in the same manner as the effluent from line 10. Optionally, the outlet 22 of header 1 can empty into line 10 upstream of where line 12 joins line 10 and downstream of valve 11 so that all of the contents of the reactor series are shortstopped by way of line 12.

It can thus be seen that pump 20 is the only pump necessary to empty every reactor of the series no matter how many reactors there are in that series. To control the flow of material from the interior of any reactor, flow recorder controller 23 is operatively connected to motor valve 24 through line 25 and to line 21 upstream of motor valve 24 by way of line 26. Thus, by flow controller 23, if the flow of liquid through line 21 exceeds a predetermined maximum value, motor valve 24 will be pinched down to slow the flow of fluid through line 21. Pressure indicator controller 30 is operatively connected to motor valve 31 through line 32 and to line 21 upstream of motor valve 31 by way of line 33. Thus, if the pressure in line 21 exceeds a predetermined maximum value, pressure controller 30 will further open up valve 31 to allow more flow of fluid through line 21.

Equalization tank 35 is operatively connected through line 36 to header 37 which in turn is operatively connected through line 38 (which contains valve 39) and line 40 (which contains valve 41) to reactors A and B, respectively. Tank 35 holds a fluid such as butadiene under a pressure, e.g. 30 p.s.i.g., and the pressurized fluid is passed into either of reactors A or B when that reactor is being emptied through header 15 to equalize the pressure on the interior of the reactor with the ambient pressure and prevent crushing of the reactor by pulling a vacuum on the interior of the reactor when withdrawing the contents therefrom. The pressurized fluid in tank 35 can be heated, e.g. by heating tank 35.

When it is desired to fill reactor A through line 42 while reactor B is still filled with reactants from a preceding polymerization reaction, it is necessary to utilize the lines and valves denoted by reference numerals 43 through 48, lines 43, 46, and 47, effectively bypassing reactors A and B, respectively.

In operation, when feed is being passed through line 2 to reactor A valves 3, 5, 7, 9, and 11 are open and valves 17, 19, 27, 28, 39, and 41 are closed. When it is desired to stop the polymerization reaction the flow of feed through line 2 is terminated, shortstop is injected through 12 into 10, reactor A is isolated from the series and its contents removed and passed into reactor B thereby emptying reactor A. In effecting this first step of the stoppage of the polymerization reaction, valves 9, 11, 17, 27, and 39 are open and valves 3, 5, 7, 19, 28, and 41 are closed. After reactor A is emptied and it is desired to empty reactor B so that all the reactors in the series are emptied, valves 19, 27, 28, and 41 are open and valves 3, 5, 7, 9, 11, 17, and 39 are closed. If it is desired to fill reactor A with new reactants for a new polymerization process while reactor B is being emptied new reactants can be introduced through line 42. In this situation valves 44 and 48 are closed and valve 45 is opened so that the material in line 21 bypasses reactor A through lines 43 and 46. It should be noted that if lines and valves 43 through 48 are employed the use of line 42 can be omitted since, by the use of lines and valves 43 through 48, line 1 is freed for filling reactor A. Also, initially, when feed is being passed through 2 into reactor A, additional reactants, e.g. catalysts, can be introduced through line 42 so that no polymerization takes place upstream from reactor A.

The rubber produced by this invention can be used for making vehicle tires of all types, gaskets, and the like.

Generally, this invention is applicable to any polymerization process amenable to being carried out in a continuous manner through a series of reactors, e.g. solution or emulsion polymerization. This invention is applicable to processes for polymerizing one or more mono-1-olefins, conjugated dienes, monovinyl substituted aromatic compounds, and the like, and mixtures thereof. Suitable polymerization processes are fully and completely disclosed in U.S. Patent 2,825,721; 3,091,606; and 3,095,406, the disclosures of which are hereby incorporated herein by reference. Any known shortstop such as water, aliphatic alcohols such as isopropyl alcohol, and the like can be employed in this invention.

EXAMPLE

Butadiene and styrene were copolymerized by a continuous emulsion polymerization process carried out at a polymerization temperature of 41° F. using ten conventional reactors hooked in series substantially in the same manner as that disclosed in the drawing and the related disclosure, and using the polymerization recipes set forth in Table I. In Table I batch shortstopping run No. 1 and continuous shortstopping run No. 1 were carried out using the same recipe for control purposes whereas continuous shortstopping run No. 2 was carried out using a different recipe to show that the invention is applicable to more than one type of polymerization process. Table I is as follows:

TABLE I

| Materials | Parts per 100 parts monomer | |
|---|---|---|
| | Batch shortstopping Run No. 1 and continuous shortstopping Run No. 1 | Continuous shortstopping Run No. 2 |
| Butadiene | 71 | 71 |
| Styrene | 29 | 29 |
| Water | 200 | 200 |
| Liquid potassium fatty (KFA) soap | [2] 2.1 | [1] 4.4 |
| Rosin soap | 2.1 | |
| Potassium chloride (KCl) | 0.3 | 0.3 |
| Secondary emulsifier | 0.2 | 0.25 |
| Chelating agent (in soap solution) | 0.02 | 0.02 |
| Chelating agent (in activator) [3] | 0.035 | 0.035 |
| Paramenthane hydroperoxide | 0.05 | 0.05 |
| Ferrous sulfate heptahydrate [3] | 0.02 | 0.02 |
| Sodium formaldehyde sulfoxylate [3] | 0.05 | 0.05 |
| Sulfole [4] | Var. | Var. |
| Dimethyl carbamate | 0.115 | 0.115 |
| Polysulfide | 0.015 | 0.015 |

[1] 4.4 parts KFA soap is prepared by using 3.88 parts potassium fatty acid plus 0.67 part KOH.
[2] 4.2 parts mixed emulsifier with 50/50 ratio of fatty acid to rosin soap is prepared by mixing 2.1 parts rosin acid with 1.85 parts of fatty acid and 0.32 part KOH.
[3] Represents 100% initiator level.
[4] Sulfole is a modifier to control molecular weight and varies from 0.07 to 0.15 part.

In the above Table I and in the following Table II the batch shortstopping referred to relates to that technique wherein after the feed to the first reactor of the series was terminated the shortstop was added to the last reactor of the series and thereafter the same amount of shortstop was added to the next adjacent upstream reactor until shortstop had been added to all reactors in the series. In Tables I and II continuous shortstopping refers to that technique wherein after the feed to the first reactor of the series had been terminated each reactor's contents was emptied through the remaining reactors of the series as described hereinabove with reference to the drawing while the shortstop is introduced into the effluent from the last reactor of the series, the contents of the last reactor of the series being removed through the feed header 1 and shortstopped in the same manner.

The results of the three runs relative to the Mooney viscosity of the product desired and the actual Mooney obtained are set forth in Table II as follows:

TABLE II

| Batch shortstopping Run No. | Continuous shortstopping (invention) Run No. | Target Mooney viscosity range for product (ML-4) set before polymerization process | Actual range of Mooney viscosity (ML-4) for product obtained from polymerization process started |
|---|---|---|---|
| 1 | | 75–79 | 82.5–99 |
| | 1 | 66–69 | 62.5–69.5 |
| | 2 | 72–75 | 74–77 |

By the above results, it can be seen that the Mooney viscosity of the polymers produced in accordance with this invention (continuous runs Nos. 1 and 2) was surprisingly closer to the Mooney viscosity desired to be obtained by the process than the Mooney viscosity of the polymer obtained by the batch shortstopping technique. This was surprising because both techniques were directed toward giving all of the polymer reaction mixture substantially the same residence time in the reactor series.

Reasonable variations and modifications are possible within the scope of this disclosure without departing from the spirit and scope thereof.

I claim:

1. A method for continuously stopping a polymerization process that is being continuously carried out through a plurality of separate polymerization zones connected to one another in series comprising (1) stopping the polymerization feed to the first reaction zone of said series, (2) isolating said first reaction zone from said series, (3) removing the polymerization reaction contents from said first reaction zone, (4) introducing said removed contents into the next adjacent downstream reaction zone of said series, (5) isolating said next adjacent downstream reaction zone from said series and repeating steps (3) and (4) using said next adjacent downstream reaction zone and its next adjacent downstream reaction zone, repeating steps (2) through (4) for each subsequent downstream pair of reaction zones until substantially all of the reaction contents present in the reaction zones of said series substantially at the time of carrying out step (1) are passed through said series, and mixing a shortstopping agent with the polymer reaction mixture recovered from said series substantially from the time of carrying out step (1) to said time when substantially all of the contents present in the reaction zones of said series at the time of carrying out step (1) have passed through said series.

2. The method according to claim 1 wherein at least said first reaction zone is filled with reactants for a new polymerization process when at least said first reaction zone is empty and one or more other reaction zones of said series are still being emptied by the process of claim 1.

3. The method according to claim 2 wherein said new polymerization process is initiated while said one or more other reaction zones are being emptied by the process of claim 1.

4. The method according to claim 1 wherein the pressure in each isolated reaction zone is equalized with the external pressure on that zone when the contents of that zone are being removed.

5. The method according to claim 1 wherein the polymerization process comprising polymerizing at least one of mono-1-olefins, conjugated dienes, monovinyl substituted aromatic compounds, and mixtures thereof.

6. The method according to claim 1 wherein the polymerization process comprises conventional emulsion copolymerization of butadiene and styrene and passing the polymerization mixture through said series of reaction zones.

7. Polymerization apparatus comprising a plurality of reactors in series, a first header means, a valved feed conduit connected to an upstream portion of said first header means, a series of individual valved conduits operatively connecting said first header means to the material input area of each of said reactors, said input conduits being connected to said first header means in the same sequence as the reactor series, individual valved first output conduits operatively connecting the material output area of each of said reactors to said first header means, the first output conduit of any given reactor being connected to said first header means downstream of the input conduit for that given reactor and upstream of the input conduit of the next adjacent downstream reactor, the valved first output conduit of the last reactor in said series being connected to the downstream output end of said first header means, a valve conduit operatively connected to said valved first output conduit of the last reactor in said series downstream from the point of joining of said valved first output conduit of the last reactor in said series and the downstream output end of said first header means for introduction of a shortstopping agent into the effluent from at least one of said last reactor and the downstream end of said first header means, a second header means, a series of valved second output conduits operatively connecting said second header means to each of said reactors in the same sequence as the reactors themselves and at a point on each reactor where substantially the entire contents of each reactor can be removed therethrough into said second header means, conduit means operatively connecting the downstream end of said second header means and an upstream portion of said first header means between said valved feed conduit and the input conduit for the furthest upstream reactor of said series, pump means operatively connected to said first and second header connecting means, a pressurized fluid container, a third header means operatively connected to said pressurized fluid container, a series of individual and valved conduits operatively connected to said third header means and each of said reactors.

8. The apparatus according to claim 7 wherein a flow controller is operatively connected to said first and second header connecting means downstream of said pump means and upstream of a valve means also operatively connected to said first and second header connecting means and adapted to control the opening of said valve means in response to the flow of fluid through said first and second header connecting means, and a pressure controller operatively connected to said first and second header connecting means downstream of said valve which is operatively connected to said flow controller means and upstream of a second valve which is also operatively connected to said first and second header connecting means and adapted to vary the opening of said second valve in response to the pressure in said first and second header connecting means.

References Cited

UNITED STATES PATENTS

| | | | |
|---|---|---|---|
| 2,375,730 | 5/1945 | Caldwell et al. | 23—260 |
| 3,254,965 | 6/1966 | Ogle | 23—260 XR |

JOSEPH SCOVRONEK, Primary Examiner

D. G. MILLMAN, Assistant Examiner

U.S. Cl. X.R.

23—260, 285; 137—572; 260—93.5, 94.2, 95